United States Patent
Kiszka et al.

(10) Patent No.: US 12,030,293 B2
(45) Date of Patent: Jul. 9, 2024

(54) SEMI-RIGID POLYURETHANE FOAM FORMULATION AND METHOD FOR MAKING FOAMED PARTS

(71) Applicant: Dow Global Technologies LLC, Midland, MI (US)

(72) Inventors: Kelly F. Kiszka, Frankenmuth, MI (US); Adam L. Grzesiak, Midland, MI (US); Yujing Tan, Midland, MI (US); Michael D. Donate, Midland, MI (US); Yiqun Zhang, Katy, TX (US)

(73) Assignee: Dow Global Technologies LLC, Midland, MI (US)

( * ) Notice: Subject to any disclaimer, the term of this patent is extended or adjusted under 35 U.S.C. 154(b) by 279 days.

(21) Appl. No.: 17/620,282

(22) PCT Filed: Jun. 26, 2020

(86) PCT No.: PCT/US2020/039725
§ 371 (c)(1),
(2) Date: Dec. 17, 2021

(87) PCT Pub. No.: WO2021/003064
PCT Pub. Date: Jan. 7, 2021

(65) Prior Publication Data
US 2022/0347995 A1 Nov. 3, 2022

Related U.S. Application Data

(60) Provisional application No. 62/868,907, filed on Jun. 29, 2019.

(51) Int. Cl.
| | |
|---|---|
| B29C 44/12 | (2006.01) |
| B29C 44/14 | (2006.01) |
| B29C 44/18 | (2006.01) |
| B29C 44/38 | (2006.01) |
| B29C 44/46 | (2006.01) |
| B29C 71/02 | (2006.01) |
| B32B 5/20 | (2006.01) |
| B32B 9/02 | (2006.01) |
| B32B 9/04 | (2006.01) |
| B32B 27/06 | (2006.01) |
| B32B 27/08 | (2006.01) |
| B32B 27/40 | (2006.01) |
| B32B 37/15 | (2006.01) |
| C08G 18/10 | (2006.01) |
| C08G 18/12 | (2006.01) |
| C08G 18/18 | (2006.01) |
| C08G 18/24 | (2006.01) |
| C08G 18/32 | (2006.01) |

(Continued)

(52) U.S. Cl.
CPC ........ *B32B 37/15* (2013.01); *B29C 44/1228* (2013.01); *B32B 5/20* (2013.01); *B32B 9/025* (2013.01); *B32B 9/046* (2013.01); *B32B 27/065* (2013.01); *B32B 27/08* (2013.01); *B32B 27/40* (2013.01); *C08G 18/1825* (2013.01); *C08G 18/3206* (2013.01); *C08G 18/3275* (2013.01); *C08G 18/3281* (2013.01); *C08G 18/4018* (2013.01); *C08G 18/4238* (2013.01); *C08G 18/425* (2013.01); *C08G 18/4825* (2013.01); *C08G 18/4841* (2013.01); *C08G 18/6644* (2013.01); *C08G 18/6655* (2013.01); *C08G 18/6662* (2013.01); *C08G 18/6677* (2013.01); *C08G 18/6688* (2013.01); *C08G 18/6696* (2013.01); *C08G 18/7664* (2013.01); *C08J 9/0028* (2013.01); *B29K 2075/00* (2013.01); *B32B 2250/02* (2013.01); *B32B 2266/0278* (2013.01); *B32B 2305/72* (2013.01); *B32B 2307/732* (2013.01); *B32B 2309/04* (2013.01); *B32B 2317/08* (2013.01); *B32B 2375/00* (2013.01); *B32B 2605/003* (2013.01); *C08J 2375/04* (2013.01)

(58) Field of Classification Search
CPC ..... B29C 44/12; B29C 44/1228; B29C 44/14; B29C 44/18; B29C 44/38; B29C 44/46; B29C 71/02; B29K 2075/00; C08G 18/10; C08G 18/12; C08G 18/14; C08G 18/1825; C08G 18/24; C08G 18/3206; C08G 18/3275; C08G 18/3281; C08G 18/36; C08G 18/4018; C08G 18/4238; C08G 18/425; C08G 18/4825; C08G 18/4841; C08G 18/6644; C08G 18/6655; C08G 18/6662; C08G 18/6677; C08G 18/6688; C08G 18/6696; C08G 18/7664; C08J 9/0028; C08J 9/34; C08J 2375/04
USPC ........ 264/46.4, 46.5, 46.6, 54, 236; 521/170
See application file for complete search history.

(56) References Cited

U.S. PATENT DOCUMENTS

| | | | | |
|---|---|---|---|---|
| 3,730,919 A | * | 5/1973 | McGinn | ............... C08J 9/34 |
| | | | | 264/48 |
| 8,901,189 B2 | | 12/2014 | McClarren | |

(Continued)

FOREIGN PATENT DOCUMENTS

| | | |
|---|---|---|
| WO | 2008/036177 A | 3/2008 |
| WO | 2009/152304 A | 12/2009 |

(Continued)

*Primary Examiner* — Leo B Tentoni

(57) ABSTRACT

Composites having a polymer or natural leather skin layer and a polyurethane foam layer are made in a molding process. The polyurethane foam layer is made from a foam formulation that includes certain polyester polyols. The presence of the polyester polyol improves flow characteristics of the foam formulation. The foam so produced has unexpectedly low quantities of VOCs.

8 Claims, No Drawings

(51) Int. Cl.
*C08G 18/40* (2006.01)
*C08G 18/42* (2006.01)
*C08G 18/48* (2006.01)
*C08G 18/66* (2006.01)
*C08G 18/76* (2006.01)
*C08J 9/00* (2006.01)
*C08J 9/34* (2006.01)
*B29K 75/00* (2006.01)

(56) References Cited

U.S. PATENT DOCUMENTS

| | | |
|---|---|---|
| 9,834,638 B2 | 12/2017 | Sounik |
| 10,023,678 B2 | 7/2018 | Burdeniuc |
| 10,907,005 B2 * | 2/2021 | Lalgudi ............... C08G 18/12 |
| 2007/0151652 A1 * | 7/2007 | Burks ............... C08G 18/1816 |
| | | 264/46.4 |
| 2011/0009515 A1 | 1/2011 | Casati |
| 2016/0016379 A1 | 1/2016 | Cavalca |

FOREIGN PATENT DOCUMENTS

| | | |
|---|---|---|
| WO | 2012/009008 A | 1/2012 |
| WO | 2014/004237 A | 1/2014 |

* cited by examiner

SEMI-RIGID POLYURETHANE FOAM FORMULATION AND METHOD FOR MAKING FOAMED PARTS

This invention relates to semi-rigid polyurethane foam formulations and methods for making foamed parts.

Certain automotive interior parts such as instrument panels, door panels and arm rests are manufactured with an exterior decorative skin backed with a layer of semi-flexible polyurethane foam. These parts are made in a molding process in which the skin is placed into the mold. Both open pour and closed pour manufacturing processes can be used. A liquid mixture of foam precursors is injected (in a closed pour process) or poured (in an open pour process) into the mold, where the mixture reacts and expands against the skin to form the part. A substrate is typically incorporated into the part during the manufacturing process and becomes adhered to the foam layer, on the opposite side as the skin.

Automotive interior parts of this type typically are elongated parts that have a thin foam layer. In the closed pour process, the foam formulation is usually injected into the mold through only one or two injection ports. Once injected, the foam formulation must be able to flow throughout the entire mold cavity and fill it without leaving voids or other defects. This is complicated due to the small thickness of the foam cavity and the rather long distances from the injection ports to remote sections of the mold, and often by the complex shape of the mold cavity. Parts that have complex geometries are made in correspondingly complex molds, which often define additional restrictions to the flow path. When a foam formulation flows poorly, more of it is needed to completely fill the mold. This produces a higher density foam. More raw materials are needed, so costs become higher. Good flow properties are therefore highly desirable.

It is also important that the cured foam has low amounts of volatile organic compounds (VOCs). VOCs escape from the foam over time or during post-molding fabrication steps such as making cutouts for the installation of vents and other components. In come cases, amine compounds contained in the foam can promote embrittlement and discoloration of some skin materials, PVC skins in particular. In addition, emitted VOCs can deposit on automotive windshields, causing fogging.

This invention is in one aspect a process for forming a skinned composite, comprising the steps of
A) introducing a polymer or natural leather skin layer and optionally a substrate into a cavity of a mold such that the polymer or natural leather skin is positioned against at least one internal surface of the mold, to produce an unfilled region of the mold cavity having a thickness of at most 25.4 mm adjacent to the polymer or natural leather skin layer;
B) introducing a polyurethane foam formulation through one or more injection ports into the unfilled region of the mold cavity;
C) before or after step B), closing the mold and
D) curing the polyurethane foam formulation in the closed mold such that the polyurethane foam formulation expands, contacts an exposed surface of the polymer or natural leather skin layer and forms a polyurethane foam that fills the unfilled region of the mold cavity and adheres to the polymer or natural leather skin layer and substrate if present, wherein the polyurethane foam formulation comprises:

I) isocyanate-reactive materials including
  a) at least one polyether polyol having a nominal hydroxyl functionality of 2 to 8 and a hydroxyl equivalent weight of 1000 to 3000;
  b) at least one crosslinker having at least 3 isocyanate-reactive groups per molecule and an equivalent weight per isocyanate-reactive group of up to 125;
  c) at least one polyester polyol having a hydroxyl equivalent weight of 150 to 1200 and a hydroxyl functionality of 2 to 4, selected from the group consisting of
    i) hydroxy-functional triglycerides and
    ii) polyesters of C6-C18 acyclic dicarboxylic acids and one or more short-chain polyols having 2 or more hydroxyl groups per molecule and a molecular weight of up to 150; and
  d) water;
II) at least one urethane catalyst; and
III) at least one organic polyisocyanate.

In another aspect, the invention is a skinned composite comprising
1) an exterior polymeric skin and
2) a polyurethane layer having a thickness of up to 25.4 mm in contact with and adhered to the polymeric skin, wherein the polyurethane layer is a reaction product of a polyurethane foam formulation that comprises
I) isocyanate-reactive materials including
  a) at least one polyether polyol having a nominal hydroxyl functionality of 2 to 8 and a hydroxyl equivalent weight of 1000 to 3000;
  b) at least one crosslinker having at least 3 isocyanate-reactive groups per molecule and an equivalent weight per isocyanate-reactive group of up to 125;
  c) at least one polyol having a hydroxyl equivalent weight of 150 to 1200 and a hydroxyl functionality of 2 to 4, selected from the group consisting of
    i) hydroxy-functional triglycerides and
    ii) polyesters of C6-C18 acyclic dicarboxylic acids and one or more short-chain polyols having 2 or more hydroxyl groups per molecule and a molecular weight of up to 150; and
  d) water;
II) at least one urethane catalyst; and
III) at least one organic polyisocyanate.

In a third aspect, the invention is a formulated polyol composition comprising
I) isocyanate-reactive materials including
  a) at least one polyether polyol having a nominal hydroxyl functionality of 2 to 8 and a hydroxyl equivalent weight of 1000 to 3000;
  b) at least one crosslinker having at least 3 isocyanate-reactive groups per molecule and an equivalent weight per isocyanate-reactive group of up to 125;
  c) at least one polyester polyol having a hydroxyl equivalent weight of 150 to 1200 and a hydroxyl functionality of 2 to 4, selected from the group consisting of
    i) hydroxy-functional triglycerides and
    ii) polyesters of C6-C18 acyclic dicarboxylic acids and one or more short-chain polyols having 2 or more hydroxyl groups per molecule and a molecular weight of up to 150; and
  d) water; and
II) at least one urethane catalyst.

The invention provides the important advantages of having excellent flow and low VOCs in the cured foam. In addition, foam produced in accordance with the invention has useful mechanical properties.

The skinned composite is made in a molding process. The mold is characterized in having a mold cavity with dimensions such that, after the polymer or natural leather skin layer(s) and any substrate are positioned into the mold, a remaining unfilled portion of the cavity no more than 25.4 mm thick (i.e., in its smallest dimension) adjacent to the polymer or natural leather skin. The unfilled portion of the mold cavity may be no more than 20 mm thick or no more than 16 mm thick. It is typically at least 2 mm thick. The thickness may or may not be constant along the entire length and/or width of the unfilled portion of the mold cavity.

The unfilled portion of the mold cavity may have a length (longest dimension) ranging from, for example, 10 cm up to 250 cm. The invention is particularly advantageous when the unfilled portion of the mold cavity (and the resulting foam layer) has a long length-to-thickness ratio. This ratio in some embodiments may be, for example, at least 5, at least 25, at least 50 or at least 100 and may be up to 500 or up to 250.

The width of the unfilled portion of the mold cavity is at least as large as the thickness and may be as large as its length. In some embodiments the width may be 10 cm to 150 cm or 15 cm to 100 cm. The width may vary along the length of the mold.

The mold in some embodiments is characterized by having one or more injection ports through which the polyurethane foam formulation is introduced into the unfilled portion of the mold cavity. The injection port(s) may be located at any convenient place(s) along the length of the mold. The invention is particularly beneficial when the injection port or ports are positioned such that the foam formulation must flow at least 5 cm, especially at least 10 cm, at least 25 cm, at least 50 cm or even at least 100 cm, from an injection port to entirely fill the unfilled portion of the mold cavity. The good flow properties of the foam formulation are particularly beneficial in such cases, in which the flow path is narrow and elongated.

The mold can be made of any material that is capable of withstanding the temperatures and pressures of the molding process without becoming distorted. Metallic, ceramic and various composite molds are all suitable.

A layer of polymer or natural leather skin is placed in the mold, adjacent to at least one side of the mold cavity. If it is desired to provide a skin layer on both sides of the polyurethane foam layer, two skin layers may be positioned in the mold, each one adjacent to an opposing side, defining an unfilled portion of the mold cavity between them.

The polymer or natural leather skin layer may have a thickness of, for example, 0.25 to 6 mm, more typically 0.5 to 2 mm. The polymer skin can be formed in any suitable manner, including various extrusion and casting methods, but a preferred method for making the skin is a dip molding or slush molding method. The polymer skin can include various surface features such as grain or other surface texturing, such as, for example, to simulate the appearance of natural leather. In certain embodiments, the skin contains weakened areas such as score lines, which allow the skin to split along predetermined lines when subjected to certain applied forces, such as the deployment of an airbag. Such score lines may be present on the exposed and/or inner surface of the skin.

The polymer skin includes at least one thermoplastic polymer. The thermoplastic polymer may be, for example, a polymer or copolymer of vinyl chloride; a polymer of copolymer of vinylidene chloride, a polyolefin such as polyethylene, polypropylene or a so-called thermoplastic polyolefin (TPO), a thermoset or thermoplastic polyurethane and the like. Polymers and copolymers of vinyl chloride are preferred thermoplastic films.

The polymer skin may contain a plasticizer. The plasticizer is a solvent for the thermoplastic polymer, preferably a solvent that has a boiling temperature at standard pressure of at least 150° C., more preferably at least 200° C., and which has a low vapor pressure at temperatures of 100° C. and below. The plasticizer preferably has a molecular weight of at least 100, preferably at least 200, more preferably at least 250, and may have a molecular weight of as much as 4000, but more typically no greater than about 1500.

Among the suitable plasticizers are various carboxylic ester compounds such as bis (2-ethylhexyl) phthalate, diisononyl phthalate, bis(n-butyl) phthalate, butyl benzyl phthalate, diisodecyl phthalate, diethyl phthalate, diisobutyl phthalate, di-n-hexyl phthalate, trimethyl trimellitate, tri-(2-ethylhexyl) trimellitate, tri-(n-octyl,n-decyl) trimellitate, tri-(heptyl,nonyl) trimellitate, n-octyl trimellitate, bis(2-ethylhexyl)adipate, dimethyl adipate, monomethyl adipate, dioctyl adipate, dibutyl sebacate, dibutyl maleate, diisobutyl maleate, various benzoate esters, various vegetable oils and modified vegetable oils (such as epoxidized vegetable oils, various sulfonamides such as n-ethyl toluene sulfonamide, n-(2-hydroxypropyl) benzene sulfonamide, N-(n-butyl)benzene sulfonamide (DOA) and the like, various phosphate esters such as tricresyl phosphate and tributyl phosphate, glycol esters such as triethylene glycol dihexanoate and tetraethylene glycol diheptanoate and the like, polybutene polymers, various acetylated monoglycerides, alkyl citrates such as triethyl citrate, acetyl triethyl citrate, tributyl citrate, triocyl citrate, acetyl trioctyl citrate, acetyl trihexyl citrate, butyryl trihexyl citrate and the like; alkyl sulphonic acid phenyl ester, 1,2-cyclohexane dicarboxylate diesters such as 1,2-cyclohexane diisononyl ester, and the like.

The skin may also be made of a natural material such as natural leather.

The skin may contain small amounts of other materials as may be useful. Among these are various colorants, which may be solid pigments and/or various types of dyes. The polymer skin may contain one or more stabilizers, fillers, preservatives, biocides, UV blockers, flame retardants, and the like.

If desired, a substrate different from the skin layer may be positioned in the mold. If present, such a substrate is positioned so as to define an unfilled portion of the mold cavity between the substrate and skin layer.

The substrate can be made of a wide variety of substances, such as an engineering thermoplastic or thermoset resin, wood, metal, ceramic, or other material that meets the requirements of the intended use for the composite. The substrate needs to be able to withstand the conditions of the polyurethane-forming reaction without becoming distorted. The function of the substrate in most cases is to provide rigidity and provide for points of attachment to other members or auxiliaries.

The polyurethane foam formulation is introduced into the mold, typically into a closed mold through one or more injection points as described before, although in some embodiments the polyurethane foam formulation can be poured into an open mold. Enough of the polyurethane foam formulation is introduced to fill the unfilled portion of the mold cavity and, preferably, to produce a foam having a foam density of no greater than 250 kg/m³. The foam density may be at least 25 kg/m³ and up to at most 80 kg/m³ or at most 64 kg/m³.

The foam formulation fills the unfilled portion of the mold adjacent to the skin layer, expands and reacts to form a polyurethane foam. The mold should remain closed until the foam formulation has cured sufficiently that it the part can be demolded without permanent distortion or damaging the foam layer. The curing time may be, for example, 1 minute to 5 hours.

The polyurethane-forming reaction is exothermic. Therefore it may not be necessary to apply heat to promote the cure, although it is within the scope of invention to do so. The temperature should not be allowed to exceed the melting temperature of the skin, and should not be so high that the skin and/or substrate melts, degrades or becomes distorted. Curing in the mold is continued until an adhesive bond is formed between skin, polyurethane layer and substrate, which bond is strong enough to allow the composite to be demolded without permanent damage.

The polyurethane layer is a reaction product of a polyurethane foam formulation that contains certain isocyanate-reactive materials, at least one organic polyisocyanate and a urethane catalyst.

The isocyanate-reactive materials include a) at least one polyether polyol having a nominal hydroxyl functionality of 2 to 8 and a hydroxyl equivalent weight of 1000 to 3000. An isocyanate-reactive material a) may have a nominal functionality of at least 3. The hydroxyl equivalent weight in some embodiments is at least 1200, at least 1500 or at least 1750 and in some embodiments the hydroxyl equivalent weight is up to 2500, up to 2200 or up to 2100.

A mixture of two or more isocyanate-reactive materials a) may be present. Such a mixture may include one or more polyols having a nominal hydroxyl functional of 2 to 3 and a hydroxyl equivalent weight as described above, and one or more polyols having a nominal functionality of 4 to 8, again having hydroxyl equivalent weights as described above. The number average nominal functionality of a mixture of isocyanate-reactive materials a) may be, for example, 2.5 to 5, 3 to 4.5 or 3.2 to 4.

The isocyanate-reactive material(s) a) are polyether polyols. They are preferably homopolymers of propylene oxide and/or block and/or random copolymers of propylene oxide and ethylene oxide. In the latter case, oxyethylene units may constitute up to 50%, preferably up to 30% or up to 25% of the total weight of the polyether polyol.

The isocyanate-reactive material(s) a) may constitute 50 to 90% of the total weight of all isocyanate-reactive materials in the foam formulation. The "isocyanate-reactive materials" are compounds that have one or more hydroxyl, primary amino and/or secondary amino groups, including water. In some embodiments isocyanate-reactive material(s) a) constitute at least 60% or at least 65% of the total weight of all isocyanate-reactive materials in the foam formulation and up to 85%, up to 80% or up to 75% thereof.

In some embodiments, a mixture of isocyanate-reactive materials a) includes at least one nominally trifunctional polyol having a functionality of 3, which constitutes 50 to 70%, preferably 55 to 65% of the total weight of all isocyanate-reactive materials in the foam formulation, and at least one polyol having a functionality of at least 4, which constitutes 5 to 25%, preferably 10 to 20% of the total weight of all isocyanate-reactive materials in the foam formulation.

The isocyanate-reactive materials also include b) at least one crosslinker having at least 3 isocyanate-reactive groups per molecule and an equivalent weight per isocyanate-reactive group of up to 125. Examples of such crosslinkers include a mono, di- or trialkanolamine such as monoethanolamine, diethanolamine, triethanolamine, monoisopropanolamine, diisopropanolamine, triisopropanolamine and aminoethylethanolamine; alkylene polyamines such as ethylene diamine, diethylene triamine, triethylene tetraamine and the like; glycerin; trimethylolpropane; trimethylolethane, sucrose, mannitol, sorbitol and the like as well as alkoxylates of any of the foregoing. In some embodiments, at least one mono-, di- and/or trialkanolamine is present. In some embodiments, at least one mono-, di- and/or trialkanolamine and at least one polyol having at least 3 hydroxyl groups per molecule is present.

The isocyanate-reactive material(s) b) may constitute, for example, 0.1 to 20 percent of the total weight of all isocyanate-reactive materials in the foam formulation. In some embodiments the isocyanate-reactive materials b) include at least one mono-, di- and/or trialkanolamine, which constitutes 0.1 to 2 percent, especially 0.25 to 1.5 percent of the total weight of all isocyanate-reactive materials in the foam formulation, and may in addition contain a polyether polyol having a hydroxyl equivalent weight of 60 to 125, which constitutes 1 to 19 percent, especially 5 to 14 percent, of the total weight of all isocyanate-reactive materials in the foam formulation.

The isocyanate-reactive material(s) c) are one or more polyester polyols having a hydroxyl equivalent weight of 150 to 1200 and a hydroxyl functionality of 2 to 4. The hydroxyl equivalent weight may be at least 175, at least 200, at least 250 or at least 300. The functionality in some embodiment is 2 to 3. The isocyanate-reactive material(s) c) are selected from the group consisting of
  i) hydroxy-functional triglycerides and
  ii) polyesters of C6-C18 acyclic dicarboxylic acids and one or more short-chain polyols having 2 or more hydroxyl groups per molecule and a molecular weight of up to 150.

The hydroxyl-functional triglycerides correspond to a reaction product of glycerin and fatty acids, which may or may not all be the same. The fatty acid groups may have 6 to 30 carbon atoms, especially 12 to 24 carbon atoms or 12 to 18 carbon atoms. The hydroxyl-functional triglycerides include oils and fats produced in biological processes by plants and/or animals. Castor oil is an example of such a triglyceride. The hydroxyl-functional triglycerides also include various oils and fats that have been modified, typically by oxidation or hydrolysis of one or more carbon-carbon double bonds, to introduce hydroxyl groups. Examples of the latter type of hydroxyl-functional triglycerides include the so-called "blown" soybean oils, which have been oxidized or hydrolyzed to introduce hydroxyl groups, such as are described in US Published Patent Applications 2002/0121328, 2002/0119321 and 2002/0090488.

The polyesters of C6-C18 dicarboxylic acids and one or more short-chain polyols include reaction products of one or more $\alpha,\omega$-alkanoic dicarboxylic acids having 6-18 carbon atoms with one or more short chain polyols. The $\alpha,\omega$-alkanoic dicarboxylic acid may be produced from longer-chain alkenoic monoacids by ozonolysis. The ozonolysis cleaves the double bond, producing a mixture of monoacids and diacids. The diacids are useful starting materials for making the polyesters ii). In some embodiments the dicarboxylic acid includes azelaic acid, which can be obtained from certain unsaturated fatty acids or plant oils via an ozonolysis method.

The short-chain polyols used to make the polyesters ii) may have molecular weights of up to 150 and 2 to 6 hydroxyl groups. The short-chain polyol may be, for example, ethylene glycol, diethylene glycol, triethylene glycol, 1,2-propylene glycol, dipropylene glycol, tripropylene glycol, 1,3-propane diol, 1,4-butane diol, neopentyl glycol, 1,5-pentane diol, 1,6-hexane diol, cyclohexane dimethanol, glycerin, trimethylolpropane, trimethylolethane, sorbitol, sucrose, mannitol, and the like, alkoxylates of any of the foregoing, or a mixture of any two or more of the foregoing.

Among the useful isocyanate-reactive materials c) ii) are branched azelaic acid/ethylene glycol polyesters such as are sold by Emery Oleochemicals as Emerox® 14001, Emerox® 14050, Emerox® 14055, Emerox® 14250, Emerox® 14270 and Emerox® 14275.

Mixtures of any two or more of the foregoing polyols c) can be used.

The isocyanate-reactive materials c) may constitute, for example, at least 5 percent, at least 7 percent or at least 10 percent of the total weight of all isocyanate reactive materials in the foam formulation, and as much as 30 percent, as much as 20 percent or as much as 15% thereof.

The isocyanate-reactive materials (I) may further include one or more polyols in addition to isocyanate-reactive materials a), b) and c). Examples of such polyols include polyester polyols different from isocyanate-reactive material c), such as aromatic polyesters, aliphatic polyesters of acyclic dicarboxylic acids having fewer than 6 carbon atoms, or aliphatic polyesters of alicyclic dicarboxylic acids. Further examples of such polyols include one or more polyether polyols having hydroxyl equivalent weights of 126 to 999. Such additional polyols, if present, preferably constitute no more than 15 percent, no more than 10% or no more than 5% of the total weight of all isocyanate-reactive materials in the foam formulation.

The foam formulation contains water, which reacts with isocyanate groups to produce urea linkages and generate carbon dioxide that acts as a blowing agent. Water may constitute at least 1 percent or at least 2 percent of the total weight of all isocyanate-reactive materials in the foam formulation, and up to 6%, up to 5%, up to 4% or up to 3.5% thereof.

The foam formulation contains at least one urethane catalyst, i.e., at least one catalyst for the reaction of an isocyanate group with an alcohol or with water. The useful catalysts include various tertiary amine compounds, various tin compound and other metal polyurethane catalysts, including those described, for example, in U.S. Pat. No. 4,390,645. A preferred type of catalyst is a so-called "reactive" amine catalyst that contains at least one tertiary amino group and at least one isocyanate-reactive group, typically a hydroxyl, primary amino or secondary amino group. Catalysts of this type react into the polymer structure as the reaction mixture cures. Examples of reactive amine catalysts include 2-propanol,1,1'-[[3-(dimethylamino)propyl]imino] bis-, 1,3-propanediamine, N-1-[2-[2[(dimethylamino) ethoxy]ethyl]-N-1-methyl, ethanol, 2-[[2-[2-(dimethylamino)ethoxy]ethyl]methylamino, and 1,3-propanediamine, N-3-[3-(dimethylamino)propyl]-N-1,N-1-dimethyl, and the like.

The organic isocyanate compound(s) contain an average of at least 1.5 and preferably at least 2.0 isocyanate groups per molecule. The polyisocyanate(s) may contain an average of as many as 8 isocyanate groups per molecule, but typically contain no more than about 4 isocyanate groups per molecule on average. The organic polyisocyanate may have an isocyanate equivalent weight as little as about 85 and as much as about 500, preferably up to 250 or up to 175.

The isocyanate groups may be bonded to aromatic, aliphatic or cycloaliphatic carbon atoms. Examples of suitable isocyanate compounds include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-4,4'-diisocyanate, diphenylmethane-2,4'-diisocyanate, diphenylmethane-2,2'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4''-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate compound is diphenylmethane-4,4'-diisocyanate, diphenylmethane-2,4'-diisocyanate, PMDI, toluene-2,4-diisocyanate, toluene-2,6-diisocyanate or mixtures of any two or more thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

Any of the foregoing isocyanates can be modified to include urethane, urea, biuret, carbodiimide, allophanate, uretonimine, isocyanurate, amide or like linkages. Examples of modified isocyanates of these types include various urethane group and/or urea group-containing prepolymers, so-called "liquid MDI" products, and the like.

The organic polyisocyanate is provided in an amount such that the isocyanate index is at least 80 and up to 125. In some embodiments, the isocyanate index is at least 90 or at least 100. It has been found that increasing the isocyanate index within these ranges tends to reduce the VOCs of the foam. It also tends to increase tensile and tear strengths.

The foam formulation may contain a trimerization catalyst, i.e., a material that catalyzes the trimerization of isocyanate groups to form isocyanurate groups. Examples of such strong trimerization catalysts include strong bases such as alkali metal salts and ammonium salts. However, such a trimerization catalyst is optional and may be omitted.

The reaction mixture may contain one or more foam-stabilizing surfactants (particularly if the polyurethane is to be cellular). Examples of surfactants that can be present if desired include alkali metal and amine salts of fatty acids; alkali metal and amine salts of sulfonic acids; siloxane-oxyalkylene polymers or copolymers and other organopolysiloxanes; oxyethylated alkylphenols; oxyethylated fatty alcohols such as TERGITOL™ 15-S-9, from The Dow Chemical Company; paraffin oils; ricinoleic acid esters; turkey red oil; peanut oil; paraffins; fatty alcohols; dimethyl polysiloxanes and oligomeric acrylates with polyoxyalkylene and fluoroalkane side groups. These surfactants are generally used (if at all) in amounts of 0.05 to 2 parts by weight based on 100 parts by weight of the polyols (i.e., components a), b) and c) and optional polyols. Organosilicone surfactants are generally preferred types. An advantage of this invention, however, is that such foam-stabilizing surfactants often are unnecessary and can be omitted. Thus, in some embodiments, the foam formulation contains less than 0.05 part by weight, preferably less than 0.1 part by weight, of any of the foregoing foam-stabilizing surfactants, per 100 parts by weight of polyols.

The reaction mixture may in addition contain other optional ingredients such as, for example, one or more physical blowing agents, one or more fillers, one or more colorants, one or more reinforcing agents, antioxidants, UV absorbers, flame retardants, biocides, and the like.

The product of the invention is a skinned composite. The skin layer is a polymer layer. The skin layer is adhered directly to a polyurethane foam layer that has a thickness of at most 25.4 mm. The foam density preferably is at least 25 kg/m³ to 250 kg/m³. The polyurethane foam layer may be adhered to a second skin layer, forming a sandwich structure. The polyurethane foam layer may be entirely encompassed by the skin layer, the skin layer in such a case being adhered to and covering all exterior surfaces of the foam layer. The polyurethane foam layer may be adhered to a substrate as described before, in addition to being adhered to the skin layer.

Composites of the invention are useful in a wide range of vehicular and construction applications. Because the skin layer is primarily decorative in function, the composites are especially useful as trim or decorative members. In vehicular applications, composites of the invention can be used, for example, as instrument panels; interior door panels; rear window shelves, steering wheels, console covers, and the like.

The following examples are provided to illustrate the invention but are not intended to limit the scope thereof. All parts and percentages are by weight unless otherwise indicated. All molecular weights are number averages by gel permeation chromatography.

Polyol A is a 2040 equivalent weight polyoxyethylene-capped polyoxypropylene polyether polyol having a nominal functionality of 3. It contains 15% by weight oxyethylene units.

Polyol B is a 250 number average molecular weight (equivalent weight about 85), nominally trifunctional polypropylene oxide).

Polyol C is an 1800 equivalent weight, polyoxyethylene-capped polyoxypropylene polyether polyol having a nominal functionality of 6.9.

Polyol D is a copolymer polyol having an equivalent weight of 1030. The base polyol is a polyoxyethylene-capped polyoxypropylene having a nominal functionality of 3. The dispersed polymer particles are styrene-acrylonitrile particles. The solids content is about 40% by weight.

Polyol E is an 1800 equivalent weight polyoxyethylene-capped polyoxypropylene having a nominal functionality of 4.2. It contains about 15.5% oxyethylene units.

Polyester 1 is castor oil.

Polyester 2 is a "blown" soybean oil that has a number average functionality of 2 and a hydroxyl number of 110.

Polyester 3 is branched ethylene glycol/azelaic acid polyester polyol having a hydroxyl number of 50 (1122 equivalent weight). It contains mainly primary hydroxyl groups.

Polyester 4 is a di(ethylene adipate) diol having a hydroxyl number of 225 (250 equivalent weight).

Polyester 5 is made from scrap polyurethane foam. It has a hydroxyl number of 170 (330 equivalent weight).

DEOA is an 85% diethanolamine product.

TEOA is 99% triethanolamine.

Catalysts A, B and C each are a mixture of amine blowing and gelling catalysts.

PMDI is a polymeric MDI having an isocyanate functionality of about 2.3 and an isocyanate equivalent weight of 132.

Foam Examples 1-5 and Comparative Samples A-C are made using the ingredients listed in Table 1.

Foams for VOC testing are made by mixing all components except the polymeric MDI in a beaker. The PMDI is then stirred in for six seconds using a high speed mixer. 90-100 grams of the resulting foam formulation are poured into a paper cup and allowed to rise freely and cure to produce a foam. This foam is used for VOC measurements testing.

Foams for physical property testing are made by combining all components except the PMDI into a formulated polyol component. The formulated polyol component and PMDI are processed using a high pressure impingement mixing machine to form a reaction mixture. Component temperatures are about 26° C. Additional portions are dispensed into a closed room temperature aluminum mold that is 12.7 mm deep, 152 mm wide and 701 mm long. In each case, the foam formulation is injected at one end of the mold and allowed to flow the entire length of the mold. Foam density and other physical properties as indicated in Table 2 are measured. The minimum fill density, i.e., the density of the lowest density foam sample that entirely fills the mold, is determined as an indication of the flow properties of the formulation.

Results of the VOC, physical property and flow testing are as indicated in Table 2.

TABLE 1

| | Parts by Weight | | | | | | | | |
|---|---|---|---|---|---|---|---|---|---|
| Ingredients | Ex. 1 | Ex. 2 | Ex. 3 | Ex. 4 | Ex. 5 | Ex. 6 | Ex. 7 | A* | B* |
| Polyol A | 55.1 | 55.1 | 55.1 | 55.1 | 55.1 | 55.1 | 69.2 | 55.1 | 57.5 |
| Polyol B | 5 | 5 | 5 | 5 | 5 | 5 | 6.3 | 5 | 0 |
| Polyol C | 2 | 2 | 2 | 2 | 2 | 2 | 2 | 2 | 2 |
| Polyol D | 0 | 0 | 0 | 0 | 0 | 0 | 0 | 0 | 6 |
| Polyol E | 10 | 10 | 10 | 10 | 10 | 10 | 12.6 | 10 | 11 |
| Polyester 1 | 18 | 18 | 18 | 18 | 0 | 0 | 0 | 0 | 0 |
| Polyester 2 | 0 | 0 | 0 | 0 | 18 | 0 | 0 | 0 | 0 |
| Polyester 3 | 0 | 0 | 0 | 0 | 0 | 18 | 0 | 0 | 0 |
| Polyester 4 | 4 | 4 | 4 | 4 | 4 | 4 | 4 | 4 | 4 |
| Polyester 5 | 0 | 0 | 0 | 0 | 0 | 0 | 0 | 18 | 14 |
| DEOA | 0.3 | 0.3 | 0.3 | 0.3 | 0.3 | 0.3 | 0.3 | 0.3 | 0.3 |
| TEOA | 0.7 | 0.7 | 0.7 | 0.7 | 0.7 | 0.7 | 0.7 | 0.7 | 0.7 |
| Catalyst A | 1.6 | 1.6 | 1.6 | 0 | 1.6 | 1.6 | 1.6 | 1.6 | 0 |
| Catalyst B | 0 | 0 | 0 | 1.6 | 0 | 0 | 0 | 0 | 0 |
| Catalyst C | 0 | 0 | 0 | 0 | 0 | 0 | 0 | 0 | 1.2 |
| Colorant | 0.3 | 0.3 | 0.3 | 0.3 | 0.3 | 0.3 | 0.3 | 0.3 | 0.3 |
| Water | 3 | 3 | 3 | 3 | 3 | 3 | 3 | 3 | 3 |
| PMDI (index) | 100 | 90 | 110 | 100 | 100 | 100 | 100 | 100 | 100 |

TABLE 2

| Property | Ex. 1 | Ex. 2 | Ex. 3 | Ex. 4 | Ex. 5 | Ex. 6 | Ex. 7 | A* | B* |
|---|---|---|---|---|---|---|---|---|---|
| VOC, ppm | 152 | 179 | 103 | 107 | 210 | 247 | 290 | 474 | 481 |
| MFD[1] (kg/m³) | 56 | 57.6 | 59.2 | 52.8 | 52.8 | N.D. | 60.8 | 62.4 | 67.2 |
| Tensile Strength, kPa | 585 | 456 | 866 | 607 | 503 | N.D. | 498 | 675 | 265 |
| Elongation, % | 62 | 76 | 72 | 68 | 75 | N.D. | 69 | 73 | 64 |
| Tear Strength, N/m | 330 | 169 | 375 | 297 | 325 | N.D. | 256 | 384 | 219 |

*Comparative.
[1]MFD is minimum fill density, an indication of the flow properties of the foam formulation.

The examples of the invention exhibit superior flow properties, as evidenced by their lower minimum fill density values. A smaller amount of the foam formulation is needed to fill the long, very small cross-section mold. This attribute permits the foam formulation to be used readily in making instrument panel foams and other foams having an elongated shape, in which the foam formulation must travel a significant distance through a restricted channel to completely fill the mold and produce a part without defects. Because less of the foam formulation is needed to produce such parts, the parts are lighter in weight and raw material costs are reduced.

VOCs in Foam Examples 1-7 (and Examples 3-6 in particular) are also significantly lower that in the comparative samples, being diminished in some cases by up to 75%. This is an important advantage for instrument panel foams and for making other foam parts that are used in closed environments. Reducing VOCs in instrument panel foams can reduce discoloration of a plastic cover layer, can reduce windshield fogging, and reduces odor.

What is claimed is:

1. A process for forming a skinned composite, comprising the steps of
   A) introducing a polymer or natural leather skin layer and optionally a substrate into a cavity of a mold such that the polymer or natural leather skin is positioned against at least one internal surface of the mold, to produce an unfilled region of the mold cavity having a thickness of at most 25.4 mm adjacent to the polymer or natural leather skin layer
   B) introducing a polyurethane foam formulation through one or more injection ports into the unfilled region of the mold cavity;
   C) before or after step B), closing the mold and
   D) curing the polyurethane foam formulation in the closed mold such that the polyurethane foam formulation expands, contacts an exposed surface of the polymer or natural leather skin layer and forms a polyurethane foam that fills the unfilled region of the mold cavity and adheres to the polymer or natural leather skin layer and substrate if present, wherein the polyurethane foam formulation comprises:
   I) isocyanate-reactive materials including
      a) 60 to 90 percent, based on the total weight of all isocyanate-reactive materials, of at least one polyether polyol having a nominal hydroxyl functionality of 2 to 8 and a hydroxyl equivalent weight of 1000 to 3000;
      b) mono-, di- or trialkanolamine in an amount of 0.25 to 1.5 percent of the total weight of all isocyanate-reactive materials;
      c) 5 to 30 percent, based on the total weight of all isocyanate-reactive materials, of at least one hydroxy-functional triglyceride having a hydroxyl equivalent weight of 150 to 1200 and a hydroxyl functionality of 2 to 4 or a mixture thereof with a diethyl adipate polyester; and
      d) water;
   II) at least one urethane catalyst; and
   III) at least one organic polyisocyanate.

2. The process of claim 1 wherein the hydroxy-functional triglyceride is castor oil.

3. The process of claim 2 wherein isocyanate-reactive material c) includes a diethyl adipate polyester.

4. The process of claim 1 wherein the mold is closed and the polyurethane foam is injected into the closed mold through one or more injection ports.

5. The process of claim 4 wherein an injection port is positioned such that the foam formulation flows at least 50 cm from an injection port to entirely fill the unfilled portion of the mold cavity.

6. The process of claim 1, wherein the substrate is present and the skin has a thickness of 0.5 to 2 mm.

7. A skinned composite comprising
   1) an exterior polymeric or natural leather skin and
   2) a polyurethane layer having a thickness of up to 25.4 mm in contact with and adhered to the polymeric skin,
   wherein the polyurethane layer is a reaction product of a reaction mixture the comprises
   I) isocyanate-reactive materials including
      a) 60 to 90 percent, based on the total weight of all isocyanate-reactive materials, of at least one polyether polyol having a nominal hydroxyl functionality of 2 to 8 and a hydroxyl equivalent weight of 1000 to 3000;
      b) mono-, di- or trialkanolamine in an amount of 0.25 to 1.5 percent of the total weight of all isocyanate-reactive materials;
      c) 5 to 30 percent, based on the total weight of all isocyanate-reactive materials, of at least one hydroxy-functional triglyceride having a hydroxyl equivalent weight of 150 to 1200 and a hydroxyl functionality of 2 to 4 or a mixture thereof with a diethyl adipate polyester; and
      d) water;
   II) at least one urethane catalyst; and
   III) at least one organic polyisocyanate.

8. The skinned composite of claim 7 wherein isocyanate-reactive material c) includes castor oil or a mixture of castor oil and a diethyl adipate polyester.

* * * * *